March 2, 1971  R. F. SHANNON  3,567,807
METHOD OF FORMING AND CARBONIZING A COMPOSITE ARTICLE
OF INORGANIC PARTICLES BONDED WITH FOAMED
PHENOL FORMALDEHYDE RESIN
Filed May 19, 1967
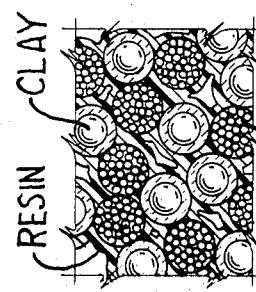
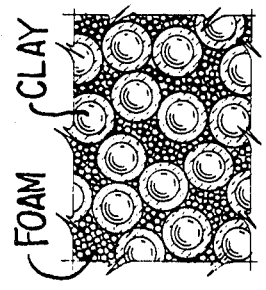
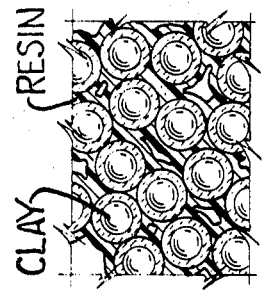
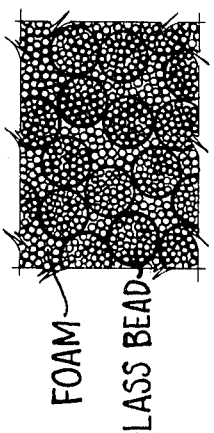
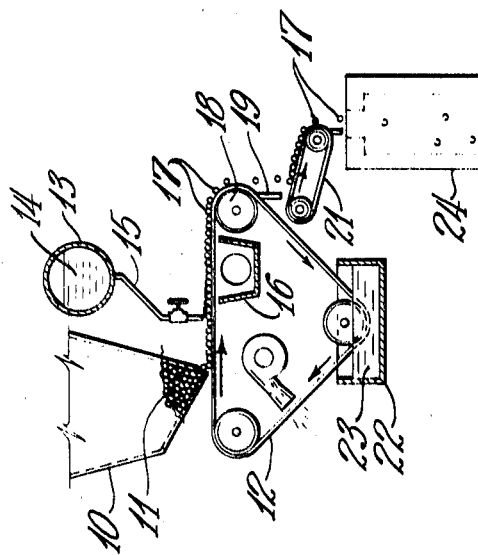
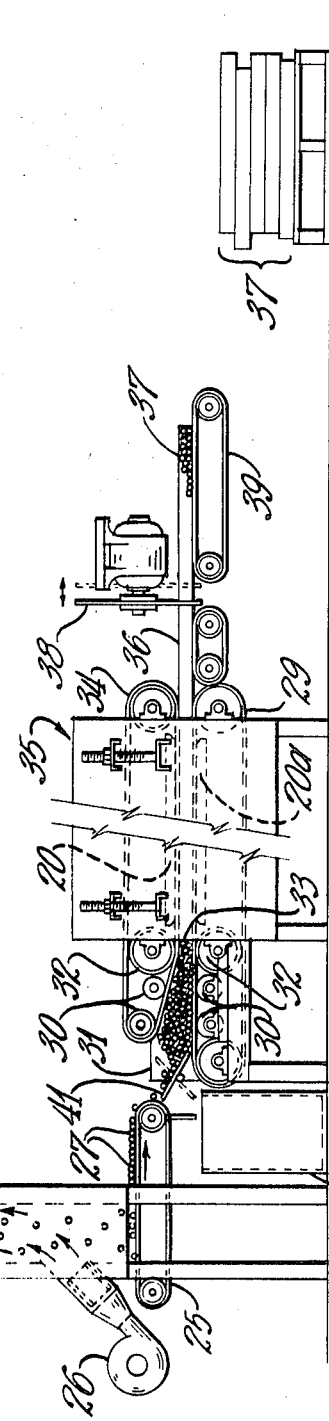
INVENTOR.
RICHARD F. SHANNON
BY
Staelin + Overman
ATTORNEYS United States Patent Office 3,567,807
Patented Mar. 2, 1971

3,567,807
METHOD OF FORMING AND CARBONIZING A COMPOSITE ARTICLE OF INORGANIC PARTICLES BONDED WITH FOAMED PHENOL FORMALDEHYDE RESIN
Richard F. Shannon, Lancaster, Ohio, assignor to Owens-Corning Fiberglas Corporation
Continuation-in-part of application Ser. No. 473,099, July 19, 1965, which is a continuation-in-part of application Ser. No. 107,946, May 5, 1961. This application May 19, 1967, Ser. No. 639,782
Int. Cl. B29c 25/00
U.S. Cl. 264—29                    4 Claims

ABSTRACT OF THE DISCLOSURE

A method of forming heat insulation material comprising pressing inorganic particles which are surrounded with a foamable phenol-formaldehyde resin into generally abutting contact, foaming the resin; heating in an oxidizing atmosphere of air to a nonkindling temperature between approximately 400° F. and approximately 600° F. for a sufficient period of time to carbonize at least part of the foam.

CROSS-REFERENCES TO RELATED APPLICATIONS

This application is a continuation-in-part of my copending application Ser. No. 473,099, filed July 19, 1965, and now abandoned, which in turn is a continuation-in-part of the then copending application Ser. No. 107,946, filed May 5, 1961, and which is now abandoned.

BACKGROUND OF THE INVENTION

This invention relates to high-temperature resistant, heat insulating structures and especially to composite structures comprising generally spherical particles bonded together by a suitable binding media.

There is a present need for materials which will withstand extremely high temperatures for at least short intervals. High speed flight, proposed space travel, and rocketry have caused a widespread search for new materials having physical properties not formerly attainable nor required.

It is an object of this invention to provide a moldable material which can be formed into high-temperature resistant products.

It is an object to provide a composite material which can be molded or otherwise formed into heat insulating, high-temperature resistant, dielectric products.

It is an object to provide a heat insulating, ceramic-like material and a process and apparatus for producing such materials.

It is also an object to provide a high-temperature resistant slab comprising inorganic beads bonded together with a carbonized, organic foam binder.

Other objects will be apparent from the disclosure in the complete description which follows.

SUMMARY OF THE INVENTION

These objects are achieved by combining a cellular particulate material and a second material which binds the particulate material together in an integral composite structure. It has been found that various cellular particulate materials such as beads of an inorganic material such as glass, clay, vermiculite, perlite and various other mineral substances can be compressed, molded, or otherwise formed into an integral structure by combining the particles with a material which acts temporarily or permanently as a binder and then bringing the particles into an integral generally abutting relationship with one another. The combination of the materials is generally followed by a heat treatment to cause a change to take place with respect to the binder material. The change may be chemical or physical or both chemical and physical but the desired result is to cause the individual particles to become fixed in an enduring, cooperating relationship to form an integral resulting product.

The cellular particulate materials useful in the present invention including those listed above absorb a certain amount of moisture from the surroundings including the atmosphere. It is known that the hydroxyl groups of the water become strongly bonded to the siliceous, aluminate, and/or argilaceous structures of the inorganic material, which hydroxyl groups change the electrostatic charge on the surface, and these hydroxyl groups are not removed excepting when heated to temperatures in excess of approximately 600° F. or more. The binder materials have OH groups chemically bound thereto, and are preferably a resinous material which provides green strength to the composite, and are most preferably a thermosetting resin which provides rigidity even when heated to binder carbonizing temperatures. The attachment of the bodies together adjacent their regions of contact is believed to occur through a condensation of the hydroxyl radicals on the surface of the bodies with the hydroxyl radicals of the organic binder material to produce either an Si—O—C bond or an Al—O—C bond. The condensation reactions, however, may not be viewed by all chemists as a true chemical bond, but may be viewed as produced by secondary bonds, sometimes referred to as physical attractions or bonds, and therefore, it is not intended to define the bond as being either solely physical or solely chemical. In addition to the permanent bond that is produced as above described, the heat treatment also should remove sufficient hydrogen from the organic material so that it will not crack or break the carbon to carbon chain when the material is later subjected to elevated temperatures. The heating step must be carried out in the presence of an oxidizing atmosphere below the kindling temperature of the organic material in order to remove the hydrogen without producing the cracking of the carbon to carbon chain. The heat treatment need not be complete, but should be carried out for a sufficient period of time to remove sufficient hydrogen to leave the organic material in a state wherein it will not crack or break apart or disintegrate during subsequent use of the product should it be purposely or accidentally raised above the kindling temperature. The reduction of the organic material provides at least a surface that is essentially carbon devoid of hydrogen. The carbon acts as a heat shield at elevated temperatures to effectively reflect infrared and other heat producing radiation.

BRIEF DESCRIPTION OF THE DRAWINGS

FIG. 1 is an elevational view of apparatus used in producing the composite bead and binder product;
FIG. 2 is a greatly enlarged view of a bead product wherein the beads are coated with a binder material;
FIG. 3 is an enlarged view of a bead and foam product;
FIG. 4 is an enlarged view of a heat treated bead composite of the invention; and
FIG. 5 is an enlarged view of another embodiment.

DESCRIPTION OF THE PREFERRED EMBODIMENTS

A preferred form of carrying out the invention involves the utilization of the apparatus and process shown in FIG. 1. Hopper 10 contains minute clay beads 11 which are deposited as a layer of beads on conveyor belt 12. These beads are grossly exaggerated with respect to size in the drawings in order to show them as beads. The spherical particles actually appear like a powder. A typical screen analysis (Tyler standard series) is as follows:

| | Percent |
|---|---|
| +20 | 0 |
| −20+30 | 100 |
| −30+30 | 0 |

Tank 13 contains liquid resin 14 which is directed onto the beads through a pipe and manifold 15. As the beads are advanced on the porous conveyor, resin is deposited on the beads and excess resin is removed from the beads as they pass over suction box 16. Resin collected in the suction box is returned to tank 13 if the resin can be recycled successfully. The resin coated beads 17 are removed from conveyor belt 12 as the belt turns downwardly around roll 18. Doctor blade 19 assures the complete removal of coated beads 17 which fall upon transfer belt 21. Conveyor belt 12 is cleaned of resin and any other contaminants as it passes through tank 22 which contains a solvent or proper cleaning liquid 23.

The coated beads 17 are then directed into drying tower 24 where the resin coating is dried as the coated beads fall downwardly through the tower onto belt 25. Hot air is directed upwardly through the drying tower by the fan and heater assembly 26.

The dried beads 27 are then directed into a container 28 or onto metal belt 29. Sideboards 31 retain the beads upon belt 29 as they are compacted by the two pairs of rolls 30, 30 and the final pair of pressure rolls 32, 32. Only one sideboard is shown in FIG. 1, but one sideboard is positioned at each side of the belt 29. Belts 29 and 34 maintain sufficient pressure upon the compacted beads to mold them into integral product. As pressure is exerted upon the beads to retain them in a compacted form, heat is applied to the composite bead and resin structure as it passes through oven 35 to insure that the resin is deformable to allow the beads to be pressed into abutment and thereafter cure and set the resin binder. The slab 36 of bonded beads is cut into panels 37 by motor-driven saw 38 which passes transversely across conveyor 39 and which advances with the conveyor while cutting the slab.

The pivotable blade 41 if placed in the dotted line position directs the treated particulate material into container 28. This material is molded by placing a sufficient amount of the resin-coated beads in a mold which is then placed in a press. The platens of a press can be used as the mold surfaces if a four-walled form is placed between the platens to retain the beads as they are pressed into an integral product. Surfacing sheets of metal, cellophane or any suitable material can be used on the platen surfaces to impress the desired surface on the molded slab or to act simply as separating sheets to facilitate removal of the slab from the press platens.

It has been found desirable to heat the molded structures to carbonize the resinous material in the composite structure when a resin is used as the binder. A product such as that shown in FIG. 2 comprises spherical particles of clay bonded together in a compacted article by a resin coating on the surfaces of the particles. When this article is heated to a sufficiently high temperature, the resinous bonds between particles are changed to carbon bonds which provide good strength and retain the integrity of product while the article is subjected to even higher temperature in actual use. It is preferred to char the resin at least at the outer surfaces exposed to the air and at some depth below the surface to provide the desired heat resistance in the final integral product. The charred outer surfaces of a slab or other molded piece act as insulating layers which reduce passage of heat into the slab upon subsequent exposure to heat. It is not necessary or desirable to cause the resin to decompose or break down completely before the insulation material is installed.

Specific materials which are used include clay beads (hollow ceramic spheres) which have a bulk density of from 19 to 24 pounds per cubic foot, and an average particle density of about 0.4 gram per cubic centimeter. These particles are disclosed in U.S. Pat. 2,676,892. A typical chemical analysis of these beads is as follows:

| | Percent |
|---|---|
| $SiO_2$ | 53.0 |
| $Al_2O_3$ | 21.5 |
| $Fe_2O_3$ | 7.2 |
| $CaO$ | 9.2 |
| $MgO$ | 5.8 |
| $Na_2O$ | 0.6 |
| $K_2O$ | 3.3 |

The density of the hollow fused clay beads is 2.37.

The resin applied from tank 13 is an alcohol solution comprising the following:

RESIN SOLUTION

| Ingredient: | Parts by wt. |
|---|---|
| Novolac resin (70% solids) | 110 |
| Hexamethylene tetramine (curing agent) | 8–6 |
| Dinitroso pentamethylene tetramine (blowing agent) | 2–4 |
| Polyoxyethylene sorbitan monopalmitate (surface active agent) | 2–4 |
| Alcohol (methyl or ethyl) | 100 |

The novolac resin used above is a 2-stage (thermoplastic) resin which requires the addition of a curing agent such as hexamethylene tetramine to advance the resin to a cured state; the resin is actually formed from formaldehyde and phenol in the first stage. The phenol formaldehyde reaction product is prepared with an acid catalyst and less than one mol of formaldehyde per mol of phenol, which reaction product is characterized by phenol-ended chains that resemble dihydroxy dihphenyl methane in structure. The polyoxyethylene sorbitan monopalmitate reduces surface tension and thereby permits formation of a fine cellular structure upon the application of heat. Additional alcohol may be added as desired to provide the proper consistency to the resin solution.

Clay beads treated with this resin are placed in a mold densified under a positive pressure of 200 p.s.i. to assure generally bead to bead contact and cured in a mold closed to stops at 350° F. for an hour to provide a product having a density of 71 pounds per cubic foot. The resin is foamed throughout the product to provide a structure such as that illustrated in FIG. 3. This clay bead and foamed novolac resin structure will withstand 1600° F. for two hours. The resin bond will carbonize but the product remains integral and retains dimensional stability. The resin bonds are replaced with carbon bonds which produce a hardened bead structure. During carbonization there is up to 25 percent loss in resin weight. The weight loss depends upon the degree of carbonization. If only the surface areas are carbonized, weight loss is less than if the product is heat soaked to achieve a more complete carbonization of the resin.

Another resin solution comprises the following ingredients in the proportions indicated.

| Ingredient: | Parts by wt. |
|---|---|
| Novolac resin (70% solids in alcohol) | 110 |
| Hexamethylene tetramine | 8–16 |
| Dinitroso pentamethylene tetramine | 2–4 |
| L-520 silicone copolymer (surface active agent) | 2–4 |
| Methyl alcohol | 70 |

The silicone copolymer reduces the surface tension of the composition and thereby permits formation of a fine cellular structure during foaming. Upon the application of heat, the silicone copolymer is converted to a hydrophobic condition which provides resistance to attack by moisture after cure of the resin foam. The silicone copolymer has the following structural formula:

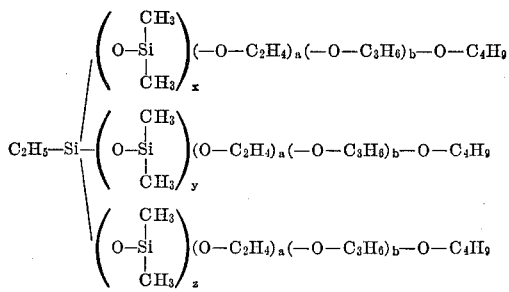

$a$, $b$, $x$, $y$ and $z$ are integers. The sum of $x$, $y$ and $z$ is approximately 20. The silicone portion is about 25 percent by weight, and the polyol about 75 percent by weight. The polyol portion is butoxy chain stopped on one end and is essentially "Ucon HB–660" polyol. "Ucon HB–660" polyol has the following properties.

Viscosity index (ASTM D–567–53)—144
Viscosity, Saybolt seconds:
    at 210° F.—125
    at 100° F.—660
    at 0° F—30,700
Refractive index—1.459
Pour point, ° F.——30
Vapor pressure—0.01 mm. Hg at 68° F.
Flash point (open cup)—440° F.
Fire point (open cup)—545° F.

The silicone copolymer is an organo silicone fluid having a specific gravity of 1.03 at 25° C., a pour point of —34° F., a flash point (COC) of 505° F., and the following viscosities in centistokes at the specified temperatures:

900 at 77° F.
600 at 100° F.
90 at 212° F.

This foamable novolac resin solution can be used as a binder for spherical particles. The foaming takes place in the oven 35 wherein the temperature is maintained at about 350° F.

Resinous materials such as phenolics, resoles and novolacs or mixtures of these, urea-formaldehyde, melamine formaldehyde, dextrine, epoxy resins, polyester resins, polyvinyl acetate, sugar, starch, vinsol and gelatine represent organic materials which may be used as binders and/or as carbon bond producers.

Products formed from any of these binder materials combined with clay beads or clay beads combined with glass beads and one of the binders form integral, high-temperature resistant products after being fired.

A compacted mass of clay beads, glass beads and a binder forms a product such as that shown in FIG. 4 when the product is heated to a sufficiently high temperature to cause the binder to carbonize and form carbon bonds. The clay beads are those described above. Suitable cellular, foamed glass beads are from about 50–600 microns in diameter. A typical composition for producing the foamed glass beads is as follows:

| | Percent |
|---|---|
| $SiO_2$ | 63.55 |
| $Na_2O$ | 13.51 |
| $H_2O$ | 16.93 |
| $Na_2CO_3$ | 6.01 |

It is generally preferred to carbonize the organic resin binder only and not to break down the organic polymer completely so that it disintegrates or is completely removed from the bead surfaces. The temperature required for charring will vary with the particular resin used but when phenolic resin foam is used an elevated temperature of from about 400° F. to 600° F. for from 6–8 hours to 3 or more days is sufficient.

The pressure utilized to effect the compaction of beads in the products described may vary. Compacting pressures may vary from about 50 p.s.i. to 1000 p.s.i. Compacting pressures developed by the pairs of rolls in the FIG. 1 apparatus are somewhat more than the pressures which must be exerted upon the layer of material passing between the belts in the oven. The former pressure should be sufficient to cause the resin to deform and allow the beads to come into abutting contact with but a very thin perhaps monomolecular, or di- or trimolecular layer of resin remaining between the beads. The latter pressures are only sufficient to resist the deformation which would be caused by foaming of a resin binder and generally the pressures used are from about 50 to 100 pounds per square inch. Regardless of whether a foamable material is used as a binder, it is desirable to maintain at least some pressure on the belts as the beads pass through the oven and the binder is set or if pressure is not exerted on the belt, then the top belt is at least maintained at a constant distance from the bottom belt by proper positioning of skid plate 20 with respect to the bottom table 20a.

Actually, no pressure is required during molding after compacting. It is preferred to mold to stops rather than to maintain an actual pressure upon the material being molded. Some pressure may be necessary to hold the platens of a press or the belts of the curing oven on the stops provided for the molding position. Any sustained pressure used is to counteract the internal pressures developed during foaming. While molding and after compaction the novolac resins may be foamed and cured at a temperature of from about 335° F. to about 365° F.

A compacted mass of two kinds of glass beads and a binder can also be utilized. Glass beads of Composition 2 which do not devitrify upon heating but which soften and fuse at a temperature of about 1550° F. are mixed with glass beads of Composition 1 with devitrify upon heating and this mixture is bonded together with a phenolic resin binder which burns and chars at 1550° F. The devitrifiable glass bead composition comprises:

COMPOSITION 1

| Ingredient: | Percent by wt. |
|---|---|
| $SiO_2$ | 45.0 |
| $Al_2O_3$ | 15.0 |
| CaO | 35.0 |
| MgO | 5.0 |
| | 100.0 |

This glass devitrifies rapidly at a temperature of 1550° F. A glass bead composition which devitrifies much slower, if at all, at this temperature, but which will soften at that temperature comprises the following:

COMPOSITION 2

| Ingredient: | Percent by wt. |
|---|---|
| $SiO_2$ | 60 |
| $AlO_3$ | 5 |
| $Na_2O$ | 15 |
| $TiO_2$ | 10 |
| $ZrO_2$ | 10 |
| | 100 |

When this composite product is heated after formation by compaction in the specified manner, the beads of Composition 1 devitrify and remain as the crystalline phase of the composite. The glass beads of Composition 2 soften and form a mechanical bond between adjacent devitrified beads, which bond is further enhanced by the carbonized phenolic resin bond formed at the same temperature. The beads of heat softenable glass, therefore, insure integrity of the product during use, even if it should become heated to very high temperatures and even if the binder should become completely oxidized.

Other glass compositions which will devitrify upon heating to lower temperatures than that specified for Composition 1 are:

COMPOSITION 3

| Ingredient: | Percent by wt. |
|---|---|
| $SiO_2$ | 52.1 |
| $Al_2O_3$ | 9.9 |
| $CaO$ | 20.1 |
| $MgO$ | 7.0 |
| $Na_2O$ | 9.5 |
| $K_2O$ | 1.1 |
| $Fe_2O_3$ | 0.3 |
| | 100.0 |

COMPOSITION 4

| Ingredient: | Percent by wt. |
|---|---|
| $SiO_2$ | 56.3 |
| $Al_2O_3$ | 5.4 |
| $CaO$ | 20.2 |
| $MgO$ | 7.0 |
| $Na_2O$ | 10.2 |
| $K_2O$ | 0.3 |
| $Fe_2O_3$ | 0.2 |
| $MnO$ | 0.3 |
| $TiO_2$ | 0.1 |
| | 100.0 |

The composite materials described herein have many uses. These materials have high strength and can be used as structural members. They are high-temperature resistant and for this reason are especially suited as components of rocket motors, jet motors, and the like. They are thermal and sound insulators and can be used in any installation requiring these properties. These compacted composites are also useful as high strength core materials for molded reinforced plastic parts. The products formed by compacting these minute beads have densities of from about 12 pcf. to 75 pcf.

Although specific materials have been disclosed, the invention is not limited to the particular materials of the examples. For instance, the clay beads may be replaced entirely or partially by foamed glass pellets. Likewise the bead or pellet dimensions may vary widely. Clay beads as large as ⅛ inch in diameter and having a bulk density as low as 12 pounds per cubic foot may be used and glass pellets even larger than ⅛ inch may be used in the described structures. Clay pellet—phenolic foam composites having a density of 25 pounds per cubic foot have been formed. Densities as low as 10 pounds per cubic foot have been produced.

Silanes which can be used in addition to the one (L–520) fully described in one of the above examples are disclosed in Shannon and Sullivan's U.S. 2,993,871 and U.S. 3,081,269. One such essentially similar silane is SF–1934 silicone. The monoalkyl-tri(polyalkoxy dialkyl siloxy) silanes produced by heating a monoalkyl-tri(poly dialkyl siloxy) silane with a liquid glycol or polyglycol are compounds disclosed in the Shannon et al. patents.

Various types of glass have the proper viscosity for foaming, and can be used to make glass foam pellets, as for example a glass of the following composition in percent by weight: $SiO_2$—54.6, $Al_2O_3$—14.3, $CaO$—17.4, $MgO$—4.8, $B_2O_3$—7.5 with less than one-half percent of each of the following: $F_2$, $R_2O(Na_2O, K_2O)$, $Fe_2O_3$, $TiO_2$, $ZnO$. Pellets are made using 100 parts by weight of this glass, 0.5 part of aluminum flake, 1.5 parts of anhydrous calcium sulphate, and 1.5 parts of barium sulphate. All the constituents of the foamable composition are in powdered form, all finer than approximately 50 mesh, U.S. sieve series, substantially all being finer than 200 mesh, aluminum flake being minus 325 mesh in its entirety. Small balls of this mixture are placed on a heat resistant surface and fed into a furnace whose atmosphere is maintained at about 1900° F. to cause the sulphate blowing agents to break down, and the mixture to fuse to produce multicellular foam glass pellets.

A 12" x 12" x 2" composite was made by tumbling 68 grams of a foamable resin mix, later to be described, with 515 grams of ⅛ inch nominal diameter glass foam pellets produced as above described and having a true density of 10 pounds per cubic foot and a bulk density of 6.8 pounds per cubic foot. These pellets have interstitial voids of 32 percent. The tumbling procedure coated the pellets with the resin and thereafter the resin was placed in a four sided box having a bottom and a movable flat plate on top of the pellets and which is slideable within the sides of the box. The movable plate was lowered upon stops which space the plate two inches from the bottom surface. The box was heated to 350° F. to cause the resin to foam and fill the interstitial voids. The final product weighed 575.5 grams and had an equivalent density of 7.6 pounds per cubic foot. The foamable resin mix was made by blending a Mix A and a Mix B immediately before application to the pellets. Mix A and Mix B have the following compositions:

MIX A

| | Grams |
|---|---|
| Resin A of Pat. 2,979,469 (refrigerated) | 250.0 |
| Tween 40 (polyoxyethylene sorbitan monopalmitate) | 12.5 |
| Diatomaceous earth | 13.0 |
| Diazoaminobenzene | 14.3 |
| Methanol | 15.0 |
| Benzene | 10.0 |

MIX B

| | Grams |
|---|---|
| Urea | 12.5 |
| 37% HCl (refrigerated) | 38.7 |

The composite made as above described was then heated in a furnace having an air atmosphere to a temperature below the kindling temperature to carbonize the phenolic foam and provide a structure as shown in FIG. 5 of the drawings. The temperature to which the composite is heated should be one at which the material does not burst into flame since an internal flame liberates excessive heat to raise the temperature to a level which produces cracking of the carbon to carbon chains of the organic material. During the initial stages of heating in the box, the compaction pressure caused the resin to soften and flow to allow the pellets to come into a generally abutting relationship at least in the plane perpendicular to the bottom surface and cover of the box.

The procedure given immediately above was repeated using a foamable powdered novolac resin mixture instead of the foamable resole resin given above. A composite was made by spreading 65 grams of a foamable novolac powder, later to be described, on the bottom of the box previously described, and then pouring 515 grams of the same glass pellets as used as above described on top of the powder. The cover was lowered on top of the pellets and was held by suitable weights in its lower position for approximately ten minutes during which time the pellets were heated to a temperature of 350° F. The pellets were in engagement with each other along the three major perpendicular planes of the composite and the voids between were thoroughly filled the resulting novolac foam. The composite weighed 575 grams and had a density of 7.6 pounds per cubic foot. The foamable novolac powder was made by mixing: 77 parts by weight of the dehydrated molten resin described in Example 1 of Pat. 2,993,871; 16 parts by weight of hexamethylene tetramine; 4 parts of the L–520 silicone given above; 4 parts of dinitroso pentamethylene tetramine. The molten mixture was cooled and solidified and ground to 40 mesh before placing in the box. This composite when heated in the carbonizing furnace as described above also had a structure as shown generally in FIG. 5.

The novolac resin of the same type described above was dissolved in methyl alcohol to provide a 70 percent by weight solution. A foamable composition was prepared by mixing the following: 110 parts by weight of the above liquid resin, 16 parts by weight of hexa methylene tetramine, 4 parts by weight of the silicone described above, 4 parts by weight of dinitroso pentamethylenetetramine and 30 parts of methanol. A 12" x 12" x 2" sample was prepared using the box as above described by coating 556 grams of pellets having a nominal one inch diameter, a true density of 11.3 pounds per cubic foot, and a bulk density of 7.345 pounds per cubic foot, with 151 grams of the above foamable liquid mix. The coated pellets were placed in the box as described above. The pellets were heated to 350° F. and the sample dielectric cured using 1.5 amps of electricity for 90 seconds. The finished composite weighed 629 grams and had a density of 8.3 pounds per cubic foot. This material when carbonized in the carbonizing furnace as above described also had the structure generally shown in FIG. 5 of the drawings.

Various modifications may be made within the spirit and scope of the appended claims.

What is claimed is:

1. The method of producing light weight heat insulation material comprising: applying a pressure between 50 and 1,000 p.s.i. to a plurality of cellular inorganic bodies of a material selected from the group consisting of foamed glass bodies, clay beads, expanded vermiculite, and expanded perlite, and which are generally coated with a foamable phenol-formaldehyde resin coating to force the bodies into generally abutting contact; foaming the resin around the bodies; and heating the foam while the bodies are in said generally abutting contact in an oxidizing atmosphere of air to a nonkindling temperature between approximately 400° F. and approximately 600° F. for a sufficient period of time to carbonize at least part of the foam.

2. The method of claim 1 wherein the bodies are coated with a solution of the phenol formaldehyde followed by the pressing of the coated bodies together causing the coating to deform and allow the bodies to come generally into contact.

3. The method of claim 1 wherein said bodies acted upon are hollow substantially unicellular clay beads.

4. The method of claim 1 wherein the bodies acted upon are multicelled foamed glass pellets.

References Cited

UNITED STATES PATENTS

| | | | |
|---|---|---|---|
| 2,676,892 | 4/1954 | McLaughlin | 106—40X |
| 2,806,509 | 9/1957 | Bozzacco | 264—331X |
| 3,029,473 | 4/1962 | Greenberg | 264—29 |
| 3,124,542 | 3/1964 | Kohn | 260—2.5 |
| 3,153,636 | 10/1964 | Shanta | 106—56X |
| 3,203,849 | 12/1968 | Katz | 161—96 |
| 3,278,660 | 10/1966 | Alford | 264—56 |

OTHER REFERENCES

Epstein, G. and Wilson, J. C.: "Reinforced Plastics for Rocket Motor Applications," S.P.E. Journal, vol. 15, No. 6, June (1959), pp. 473–479.

Schmidt, Donald L.: "Behavior of Plastics in Re-entry Environments," Modern Plastics, vol. 38, November (1960), pp. 131–134, 137, 138, 140.

JULIUS FROME, Primary Examiner

P. A. LEIPOLD, Assistant Examiner

U.S. Cl. X.R.

117—46; 106—41; 264—45, 46; 264—47